United States Patent
Seroussi et al.

(10) Patent No.: US 8,315,383 B2
(45) Date of Patent: Nov. 20, 2012

(54) METHOD AND APPARATUS FOR RANDOM BIT-STRING GENERATION UTILIZING ENVIRONMENT SENSORS

(75) Inventors: Gadiel Seroussi, Cupertino, CA (US); Mark Taylor Smith, San Mateo, CA (US); Michael Baer, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3948 days.

(21) Appl. No.: 09/916,785

(22) Filed: Jul. 27, 2001

(65) Prior Publication Data

US 2003/0021411 A1  Jan. 30, 2003

(51) Int. Cl.
*G06F 21/00* (2006.01)
(52) U.S. Cl. ............................... 380/46; 380/44
(58) Field of Classification Search ............ 380/46; 713/182; 708/250–256
See application file for complete search history.

(56) References Cited

U.S. PATENT DOCUMENTS

| | | | | |
|---|---|---|---|---|
| 4,641,840 | A * | 2/1987 | Larson | 463/22 |
| 6,046,616 | A * | 4/2000 | Chan et al. | 327/164 |
| 6,369,727 | B1 * | 4/2002 | Vincze | 341/131 |
| 6,430,170 | B1 * | 8/2002 | Saints et al. | 370/335 |
| 6,542,014 | B1 * | 4/2003 | Saito | 327/164 |
| 6,609,139 | B1 * | 8/2003 | Dultz et al. | 708/250 |

FOREIGN PATENT DOCUMENTS
EP  1081591  3/2001

OTHER PUBLICATIONS

Ritter, T.—The Hardware Random Number Generator: A Ciphers by Ritter Page, www.ciphersbyritter.com/NEWS4/HARDRAND.HTM, Jan. 25, 1999 p. 1-145.*
Individual Logic Gates and De Morgan's Theorem, www.ece.msstate.edu/classes/ece3281/lab/3281exp8.doc, Oct. 16, 2000, p. 1-10.*
Ellison, Carl, "Cryptographic Random Numbers", IEEE P1363 Appendix E, Draft version 1.0, Nov. 11, 1995.*
Callas, Jon, "Using and Creating Cryptographic-Quality Random Numbers", Jun. 1996, http://web.archive.org/web/19970518180734/http://www.merrymeet.com/jon/jon@worldbenders.com, accessed on Sep. 26, 2005.*
Eastlake et al., "Randomness Recommendations for Security", RFC 1750, Dec. 1994.*
D Eastlake—RFC 1750—Randomness Recommendations for Security—Dec. 1994.
IBM Technical Disclosure Bulletin—Random Numbers Produced Via a Technique Employing Both a White Noise Generator and the Data Encryption Algorithm—vol. 34 bo 7B—Dec. 1, 1991—pp. 316-318.

* cited by examiner

*Primary Examiner* — Eleni Shiferaw
*Assistant Examiner* — Jeffery Williams

(57) ABSTRACT

A random number generator that generates random numbers based on measurements of one or more environmental quantities. The random number generator includes a first sensor for generating a first sequence of digital values representing measurements of a first environmental quantity at successive times. A first compressor that provides a first sequence of compressed values having a lower internal correlation than the values of the first sequence of digital values compresses the sequence of digital values. The random number generator generates an output random number via a circuit for generating a random number from an input sequence of digital values, the input sequence being a function of one of the first sequence of compressed values. The circuit may utilize a hash function to provide further security. In addition, the circuit includes a blocking circuit for preventing the generator from outputting a random number if the input sequences fail a predetermined test.

4 Claims, 1 Drawing Sheet

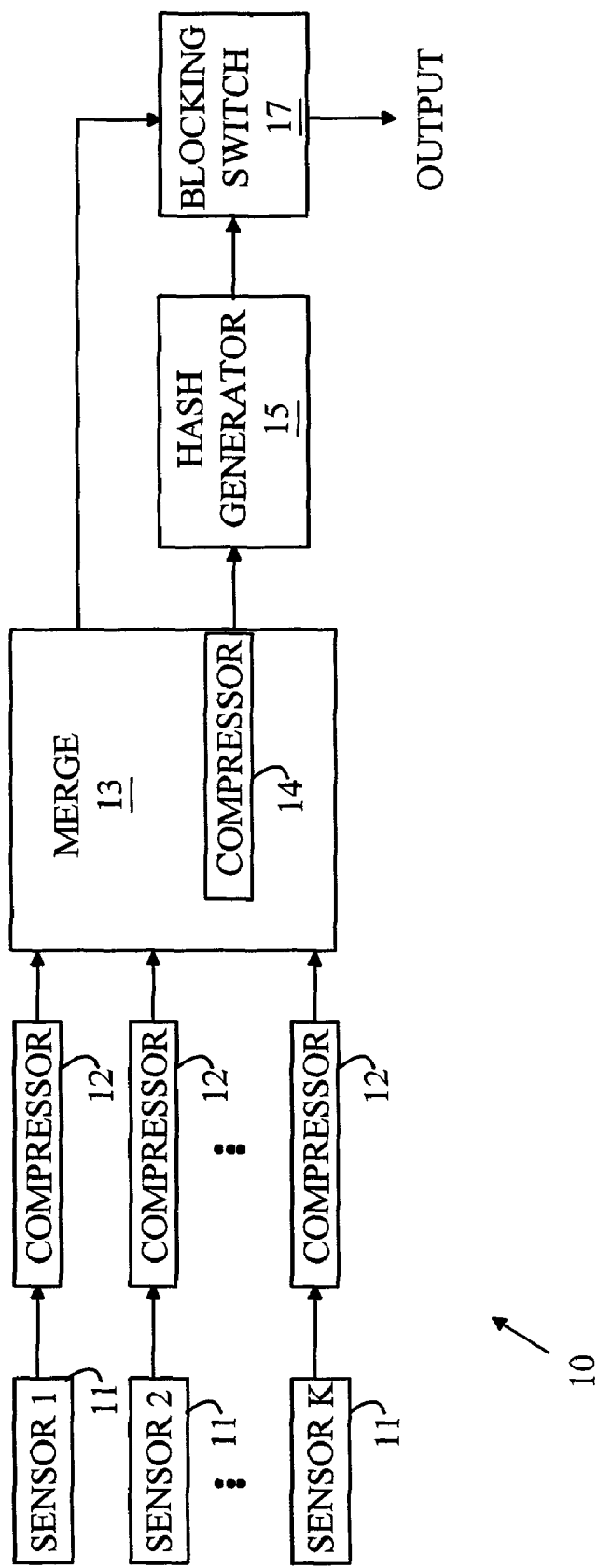

METHOD AND APPARATUS FOR RANDOM BIT-STRING GENERATION UTILIZING ENVIRONMENT SENSORS

FIELD OF THE INVENTION

The present invention relates to random number generators, and more particularly, to a random number generator that utilizes environmental sensors to reduce the predictability of the sequence of random numbers generated thereby.

BACKGROUND OF THE INVENTION

Many systems utilize secure communication channels to prevent an eavesdropper from gaining information contained in a communication between two users on that channel. The communication protocols used to secure such channels often depend on each party being able to generate a long random number. For example, a cryptographic protocol might call, in one of its steps, for a participating device to generate a string S of n random bits, where n is a pre-specified positive integer. The string S is to be kept secret to outside access. To maximize cryptographic strength, it is typically required that the n bits generated in such a step be essentially unpredictable by any third party not given legitimate access to S by the protocol. Namely, such third party would essentially have to exhaustively search, on the average, through $2^{n-1}$ binary strings before correctly "guessing" S.

While there are pseudo random number generation algorithms that can be executed on a computer to generate a string of seemingly random numbers, these algorithms generate a predetermined sequence of numbers that is determined by a "seed" number. A party observing the seed would be able to predict the numbers to be generated. In fact, a portion of this sequence itself should be sufficient to guess the next numbers; computational difficulty is all that prevents this from occurring in a practical system.

Random number generators that utilize some environmental measurement to reduce the predictability of the sequence of random numbers are also known to the art. For example, pulses in a noise signal generated from a large resistor can be counted in a counter to provide a random number generator. However, these systems also have correlations that can be exploited to reduce the search list. In addition, these systems can be subjected to physical conditions that increase the correlations in question. For example, the resistive element can be cooled, thereby reducing the number of random pulses generated during each time interval.

Broadly, it is the object of the present invention to provide an improved random sequence generator.

These and other objects of the present invention will become apparent to those skilled in the art from the following detailed description of the invention and the accompanying drawing.

SUMMARY OF THE INVENTION

The present invention is random number generator that generates random numbers based on measurements of one or more environmental quantities. In one embodiment, the random number generator includes a first sensor for generating a first sequence of digital values representing measurements of a first environmental quantity at successive times. A first compressor that provides a first sequence of compressed values often having a lower redundancy or internal correlation than the values of the first sequence of digital values compresses the sequence of digital values. The random number generator generates an output random number via a circuit for generating a random number from an input sequence of digital values, the input sequence being a function of one of the first sequences of compressed values.

In a second embodiment, the random number generator also includes a second sensor for generating a second sequence of digital values representing a measurement of a second environmental quantity at successive times, and a compressor for compressing that sequence. In this embodiment, a merge circuit for combining the first and second sequences of digital values to provide a merged sequence is also included. The random number generating circuit utilizes a digital value determined by the merged sequence. The merge circuit may include a third compressor for compressing the merged sequence to form a compressed merged sequence having a lower internal correlation than the merged sequence, the circuit for generating a random number utilizing the compressed merged sequence.

In another embodiment of the present invention, the circuit for generating a random number includes a circuit for applying a hash function to a sequence of digital values that depends on the first sequence of compressed values. In yet another embodiment of the invention, an output blocking circuit prevents the random number generator from outputting a random number if the input sequence fails a predetermined test.

BRIEF DESCRIPTION OF THE DRAWINGS

FIG. 1 is a block diagram of a random number generator 10 according to the present invention.

DETAILED DESCRIPTION OF THE PREFERRED EMBODIMENTS OF THE INVENTION

The manner in which the present invention provides its advantages may be more easily understood with reference to FIG. 1, which is a block diagram of a random number generator 10 according to the present invention. Random number generator 10 makes use of a combination of individual sensors, together with data compressors, a merging block, and a hashing block, to generate random bit-strings of a specified length.

Random number generator 10 utilizes the K sensors shown at 21-23 to generate K bit-streams. Each sensor measures the fluctuations in some environmental parameters. The environmental parameters are chosen such that the fluctuations in the environmental conditions of a device, measured by the sensors, will be very difficult to predict by a third party. Therefore, sequences of such measurements can be used, in principle, as random data. However, it is important to control the amount of actual uncertainty in the measurements, to guarantee that enough random data is generated. Such sensors can be based on the measurement of temperature, sound, motion, light intensity, ambient electromagnetic radiation, etc.

Consider a sensor that measures the temperature to generate a value that is shifted out as a binary string. Successive samplings of the temperature by the sensor will usually result in data words in which the high order bits repeat from sample to sample, and these high order bits will be highly predictable by gaining access to one such measurement. Furthermore, a malicious third party might attempt to control some of the environment parameters (e.g. light, temperature, acoustical levels, etc.) to further reduce the uncertainty in the sensor measurements, and thus improve the odds of guessing the secret string S.

Accordingly, the present invention includes a processor that reduces the redundancy (and thus the predictability) in the sequence of samples of a given sensor. In the preferred embodiment of the present invention, this processor utilizes data compression to reduce the redundancy. The number of bits produced by an ideal data compressor approaches the entropy rate of its input source which is, in a sense, a true measurement of the uncertainty of the source. Hence, each sensor feeds a data compressor that generates a compressed data stream having a lower internal correlation than the data stream generated by the sensor. The data compressors corresponding to sensors 21-23 are shown at 31-33, respectively.

For example, consider a sensor that operates by measuring the voltage across a thermistor. The measured voltage may be viewed as being the sum of a value that is correlated with the temperature and a noise value that fluctuates from measurement to measurement in an unpredictable manner. Assume that the voltage is measured to a precision of 16 bits and the noise value alters the least significant 6 bits. Since the 10 most significant bits represent the temperature, these bits will track the temperature, and hence, are predictable. Consider a data compressor that stores a sequence of successive measurements and fits the stored measurements to a polynomial. As each new measurement arrives, the oldest stored measurement is discarded and the new measurement is stored in its place. The stored values are then fitted to the polynomial, and the polynomial value which represents the predicted value at the time of the latest measurement is then subtracted from the latest measurement to provide the output measurement word that may be viewed as a bit stream that is shifted out of the sensor.

To further assure that the output random number is secure, the compressed measurements from a plurality of sensors are combined by merge circuit 13. Merge circuit 13 also monitors the combined output bit stream to assure that enough bits are produced in the compressed streams to satisfy the uncertainty requirements of the protocol.

The compressed bit streams can be combined in a number of different manners. The simplest method for combining the compressed bit streams is to concatenate the output words from each compressed source. Since the compressed bit streams will, in general, produce different numbers of bits, different sources may be weighted differently in the combined output. Merge and check circuit 13 can avoid this unequal weighting by weighting the sources inversely to the rate at which each source produces bits. Hence, if source 1 produces half the bits of source 2, Merge circuit 13 would combine two words from source 1 with one word from source 2, so that the output would have equal numbers of bits from each source. The outputs can be concatenated by concatenating words or by taking bits successively from each source. While the preferred embodiment of the present invention attempts to take roughly equal numbers of gits from each source, embodiments in which other combining algorithms are used may also be practiced. For example, embodiments in which different numbers of bits are taken from each sensor, depending on the sensor can also be practiced. Similarly, embodiments in which a minimum number of bits are taken from each source before preceding to the next source can also be utilized.

Merge circuit 13 may also perform data compression on the combined bit streams as shown at 14 to remove possible correlations between the sensor outputs.

To further assure the security of the random number generated by random number generator 10, the random number generator also utilizes a secure hash function as shown at 15. Assume that the cryptographic protocol requires n random bits, for some positive integer n (e.g., n=160 is used in one preferred embodiment). The merge circuit is programmed to produce a string of m bits, for some integer m>n. The number m will typically be taken as a moderately large multiple of n (e.g., m=20n) to account for imperfections in the data compression algorithms. The block of m bits is then used as input to a standard secure hash function (e.g., SHA-1 or MD5), which produces an output block of size n. The latter block is used as the random bit-string. A secure hash function is a many-to-one mapping satisfying certain desired properties, e.g.: every input bit affects every output bit; given an n-bit output block it is computationally infeasible to reconstruct an input block that will produce the given output block. Since such hash functions are well known to those in the art, they will not be discussed in detail here. The reader is directed to Handbook of Applied Cryptography by Menezes, Van Oorschot, and Vanstone (CRC Press, 1997). or similar reference for a more detailed discussion of such functions.

In the preferred embodiment of the present invention, merge circuit 13 also monitors the output of the compressors to determine that enough random data has been produced by the compressors to generate an m-bit block as input to the hash function. If sufficient data has not been generated, merge circuit 13 generates a control signal that is utilized by blocking switch 17 to prevent the random number generator from outputting a random number. Hence, any cryptographic system requiring the number will be held up until sufficient data has been generated.

In addition to examining the lengths of the compressed streams, merge circuit 13 can also apply other criteria to judge the randomness of the sensor data, and thus determine whether sufficient random data has been generated to allow the random number generator generated by hash circuit 15 to be outputted. These criteria can include additional statistical tests (e.g. those specified in federal standard FIPS 140), correlations, comparisons against previously produced random strings. For example, merge circuit 13 can also require that a minimum number of random bits be produced by each sensor to assure that one sensor is not dominating the output.

To illustrate how data compression combined with the blocking function can work to avoid the adverse effects of a defective or maliciously disabled sensor, consider the case where one sensor is "stuck" at a fixed reading. A carefully designed, efficient compressor will compress a string of N repetitions of the same value to a string of length proportional to log N. Thus, by requiring the compressed string for the sensor in question to attain a certain length L, a waiting time that is exponential in L will be imposed before the device can be "unblocked". A judicious choice of L will make this waiting time infeasible for a defective sensor, but unnoticeable for a sensor fluctuating as expected. Hence, a defective sensor will disable the device and prevent the associated cryptographic algorithm from proceeding. To aid in the disablement of the device attached to the random number generator, the control signal to the blocking switch can also be provided as a "valid data" signal to the outside circuitry to signal a lack of valid data.

Various modifications to the present invention will become apparent to those skilled in the art from the foregoing description and accompanying drawings. Accordingly, the present invention is to be limited solely by the scope of the following claims.

What is claimed is:

1. A random number generation device comprising:
an environmental sensor that generates digitally encoded sensor values;

a compressor that receives the digitally encoded sensor values generated by the environmental sensor and compresses the received digitally encoded sensor values to generate a compressed data stream;

a monitor that receives the compressed data stream and monitors the compressed data stream to determine whether or not sufficient data has been received in the compressed data stream to generate a next random number;

a random number generator that receives data from the compressed data stream and outputs random numbers; and a blocking switch controlled by the monitor to block output of a next random number by the random number generator when sufficient data to generate the next random number has not been received in the compressed data stream to generate a next random number.

2. The random number generation device of claim 1 further comprising:

one or more additional environmental sensors;

an additional compressor for each of the one or more additional environmental sensors; and a merging component that merges compressed data streams output by the compressor and the additional compressor for each of the one or more additional environmental sensors to produce a merged, compressed data stream that is output to the monitor and random number generator.

3. The random number generation device of claim 2 wherein the random number generator applies a hash function to the received data to produce a random number for output by the random number generation device.

4. The random number generation device of claim 2 wherein each environmental sensor monitors an environmental parameter, the environmental parameter selected from among environmental parameters including:

temperature;
sound;
motion;
light intensity; and
ambient electromagnetic radiation.

* * * * *